United States Patent
Hama et al.

(10) Patent No.: US 9,311,576 B2
(45) Date of Patent: Apr. 12, 2016

(54) CORRECTION METHOD OF PRINTING DATA

(71) Applicant: SEIKO EPSON CORPORATION, Tokyo (JP)

(72) Inventors: Yoshikazu Hama, Okaya (JP); Yuya Haneda, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/313,375

(22) Filed: Jun. 24, 2014

(65) Prior Publication Data

US 2014/0376057 A1   Dec. 25, 2014

(30) Foreign Application Priority Data

Jun. 25, 2013   (JP) ................... 2013-132384

(51) Int. Cl.
*G06K 15/02* (2006.01)
*H04N 1/60* (2006.01)
*H04N 1/40* (2006.01)

(52) U.S. Cl.
CPC .......... *G06K 15/1868* (2013.01); *G06K 15/021* (2013.01); *G06K 15/1878* (2013.01); *H04N 1/6097* (2013.01)

(58) Field of Classification Search
USPC ........ 358/3.24, 1.9; 347/104, 9, 102; 235/487
See application file for complete search history.

(56) References Cited

U.S. PATENT DOCUMENTS

| | | | |
|---|---|---|---|
| 6,361,164 B1 * | 3/2002 | Sansone | 347/107 |
| 2009/0208101 A1 | 8/2009 | Harigai | |
| 2010/0098443 A1 * | 4/2010 | Oka | 399/39 |
| 2012/0133696 A1 * | 5/2012 | Tomita et al. | 347/14 |
| 2013/0058662 A1 * | 3/2013 | Nomura | 399/15 |

FOREIGN PATENT DOCUMENTS

| | | |
|---|---|---|
| JP | 2009-225424 | 10/2009 |
| JP | 2012-051218 | 3/2012 |

* cited by examiner

*Primary Examiner* — Quang N Vo

(74) *Attorney, Agent, or Firm* — Workman Nydegger

(57) ABSTRACT

Disclosed is a correction method of printing image data, including correcting printing data for printing, based on color information of an adhering medium bonded to a printing medium after performing printing on the printing medium.

6 Claims, 3 Drawing Sheets

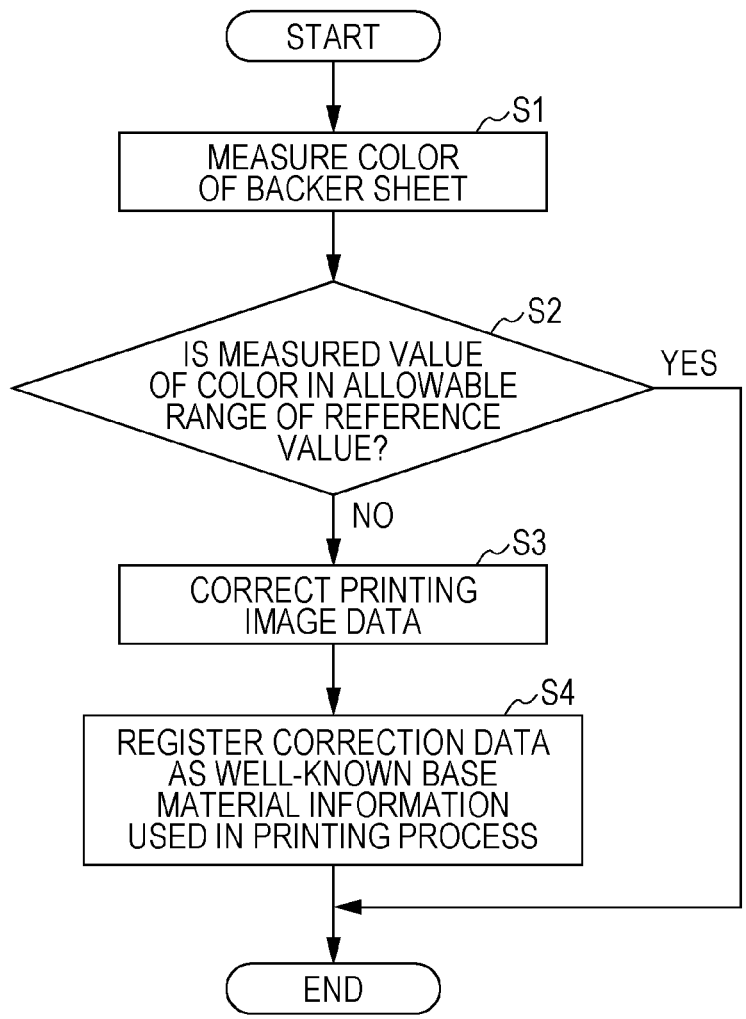

CORRECTION METHOD OF PRINTING DATA

BACKGROUND

1. Technical Field

The present invention relates to a correction method of printing data.

2. Related Art

Conventionally, a decorative sheet which is used when a surface of a small-sized electronic device, such as a vehicular interior part, a mobile phone, a personal computer, or the like is decorated, and a decorative molding article which uses the decorative sheet, are widely used. The decorative sheet has a single-layered structure which is obtained by pattern-printing on a sheet material made of thermoplastic resin. However, in order to make the decorative sheet having an excellent design property with a texture, such as a three-dimensional effect, a decorative sheet of a multi-layered structure which is configured to include a printing sheet (original printing material) having a printing surface (pattern printing layer), a backer sheet bonded to the printing sheet, and further, a transparent thermoplastic sheet laminated on the printing surface of the pattern-printed printing sheet, is suggested and used (refer to JP-A-2012-51218).

As a printing method on the printing sheet, it is possible to use various printing methods. However, as one of the printing (decorating) methods, a decoration printing method (ink jet printing method) using an ink jet printing apparatus is applied. In the decoration printing method each color of ink is ejected onto a printing surface from an ink jet head and a printing film for decorating is formed on a printing surface by hardening the landed ink. According to the decoration printing method, since a block-copy is not required, it is possible to perform the decoration at a low-cost. As printing image data is appropriately generated, it is possible to apply a decoration printing to express a delicate texture.

However, in a case where the decoration printing is applied on the decorative sheet of the multi-layered structure described in JP-A-2012-51218, there is a concern that a color of the backer sheet bonded so as to back the printing sheet affects a color of an image printed on the printing sheet, and a desired decoration cannot be obtained. In other words, in a case where a color of the backer sheet is changed due to an unevenness of manufacturing for every manufacturing lot of the backer sheet, a color of a decoration printing pattern formed by using the printing image data including image data based on a reference value of color information of the backer sheet is different from a desired color due to the color change of the backer sheet, and thus a desired decoration printing image may not be obtained.

SUMMARY

The invention can be realized in the following forms or application examples.

Application Example 1

According to this application example, there is provided a correction method of printing image data, including correcting printing data for printing, corresponding to color information of an adhering medium bonded to a printing medium after performing printing on a printed medium.

According to the application example, since the printing data is corrected based on the color information of a backer sheet which is the adhering medium, it is possible to apply a decoration in which a desired color is realized.

Application Example 2

In the correction method of the printing image data according to the application example, it is preferable that the color information be measured for every manufacturing lot of the adhering medium and the printing data be corrected based on the measured color information of the adhering medium.

According to the application example, since a color difference is corrected for every manufacturing lot of the backer sheet which is the adhering medium, it is possible to apply the decoration in which the desired color is realized.

Application Example 3

In the correction method of the printing data according to the application example, it is preferable that the color information be reflected color information of a surface of the adhering medium to which the printing medium is bonded.

In the color information included in the backer sheet, since the reflected color information of the surface to which the printing sheet is bonded affects a color of the decorative sheet after printing, it is possible to correct the printing data efficiently and more effectively and perform decorating according to the application example.

Application Example 4

In the correction method of the printing data according to this application example, it is preferable that the printing data be created based on a reference value of the color information of the adhering medium, and that the printing data be corrected based on a difference between the color information of the adhering medium bonded to the printing medium after performing printing and the reference value.

According to the application example, it is possible to correct the printing data efficiently and more effectively and perform decorating.

BRIEF DESCRIPTION OF THE DRAWINGS

The invention will be described with reference to the accompanying drawings, wherein like numbers reference like elements.

FIG. 2 is a flowchart illustrating a correction method of printing image data according to the embodiment.

DESCRIPTION OF EXEMPLARY EMBODIMENTS

Hereinafter, an embodiment of the invention will be described with reference to the accompanying drawings. In addition, in each drawing, in order to make a size of each member recognizable, dimensions of each member are illustrated differently from real size.

Decorative Sheet

Figure 1:
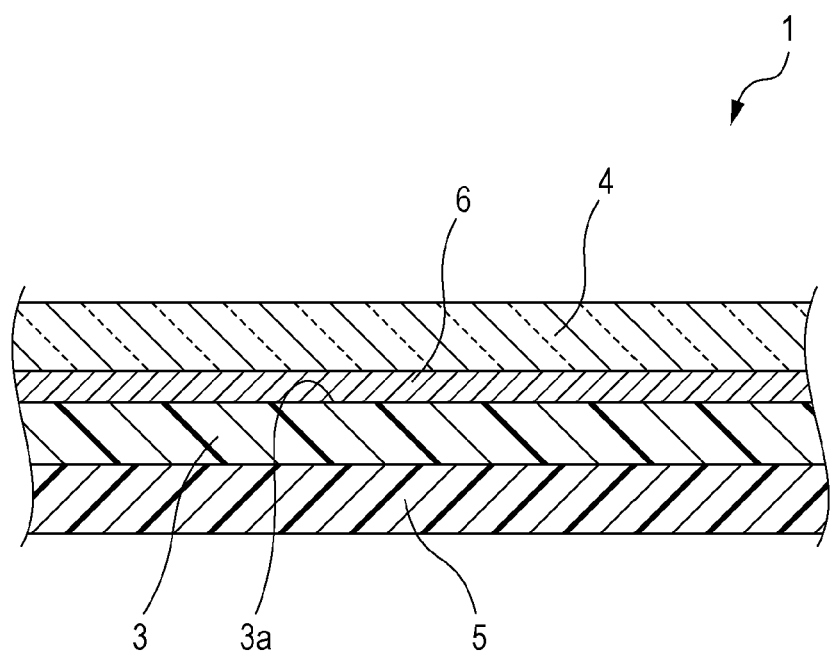
FIG. 1 is a schematic partial cross-sectional view illustrating a decorative sheet according to an embodiment.

FIG. 1 is a schematic partial cross-sectional view illustrating a decorative sheet according to Embodiment 1.

In FIG. 1, a decorative sheet 1 is configured to include: a printing sheet 3 (printing medium) having a printing surface (decorating surface) 3a on which a pattern printing layer 6 is formed; a transparent sheet 4 laminated on the printing surface 3a of the printing sheet 3 on which the pattern printing layer 6 is formed; and a backer sheet 5 (adhering medium) laminated on a surface which is opposite to the printing surface 3a of the printing sheet 3.

In addition, the printing sheet 3 which is a printing medium and the backer sheet 5 which is an adhering medium are bonded to each other by a glue or an adhesive which are not shown in the drawings.

The printing sheet 3 which is the printing medium is a sheet made from a thermoplastic resin. On the printing surface 3a of the printing sheet 3, the pattern printing layer 6 is formed.

As a base material of the printing sheet 3, it is possible to use thermoplastic resins, such as vinyl chloride resin, polyolefin-based resin, acrylic copolymer resin, and polyester-based resin. However, from the viewpoint of environmental load, among the above-described thermoplastic resins, it is preferable to use the polyolefin-based resin which has appropriate flexibility, chemical resistance, and post-processability required as characteristics of the printing sheet 3, and which is provided at a low cost.

The transparent sheet 4 protects the pattern printing layer 6 formed on the printing surface 3a of the printing sheet 3, is made from the thermoplastic resin such as transparent acrylic-based resin, and is laminated so as to cover the entire surface of the printing surface 3a of the printing sheet via the transparent laminated layer (not shown in drawings).

As a material of the transparent resin sheet which forms the transparent sheet 4, polyolefin-based resin, polyester-based resin, acrylic-based resin, or the like is used. However, among these, it is preferable to use acrylic-based resin for the transparent thermoplastic sheet from the viewpoint of transparency, surface hardness properties, and weather resistance.

The backer sheet 5 which is the adhering medium is adhered with the printing sheet 3 on which the above-described pattern printing layer 6 is formed and the transparent sheet 4, can be manufactured in a desired shape by molding processing according to requirements, and is formed by using the different thermoplastic resin from the printing sheet 3. Specifically, for example, the backer sheet 5 is formed by using the thermoplastic resin which has a glass transition temperature of 30° C. or higher than that of the printing sheet 3. In addition, the backer sheet 5 is formed in a sheet shape with a thickness greater than or equal to 0.5 times and less than or equal to 5.0 times with respect to the thickness of the printing sheet 3, for example.

As a sheet base material of the backer sheet 5, it is possible to use vinyl chloride resin, polyolefin-based resin, acrylic copolymer resin, polyester-based resin, or the like. However, considering thermal resistance and adhesion with the printing sheet 3, it is preferable to use acrylic-based or polyester-based material.

The decorative sheet 1 configured as above can be molded in a predetermined shape by a molding method, such as pressing by using upper and lower metal molds.

As a method of forming the pattern printing layer 6 on the printing surface 3a of the printing sheet 3, it is possible to use various printing methods. However, as one of the printing (decorating) methods, it is preferable to use a decoration printing method (ink jet printing method) by using an ink jet printing apparatus. The ink jet printing method ejects each color of ink onto the printing surface 3a from an ink jet head, hardens the landed ink, and forms the pattern printing layer 6 for decorating on the printing surface 3a. According to the ink jet printing method, it is possible to perform the decoration at a low cost since a block-copy is not required, and to apply the decoration printing which expresses a delicate texture by appropriately forming the printing image data.

In addition, the decorative sheet 1 applied by the decoration printing can be molded in the predetermined shape by a molding method, such as pressing by using upper and lower metal molds. The above-described printing image data includes drawing data and molding data.

In the above-described decorative sheet 1 of the multi-layered structure, in a case where the printing sheet 3 that is the printing medium, on which the pattern printing layer 6 is formed by applying the decoration printing, adheres to the backer sheet 5, there is a concern that the color of the backer sheet 5 laminated so as to back the printing sheet 3 affects the color of the pattern printing layer 6 as an image on the decorative sheet 1, and the decoration of the desired color is not possible. For example, for every manufacturing lot of the backer sheet 5, there is a possibility of color change of the backer sheet 5 due to the unevenness of manufacturing. When the color changes greatly, the color of the pattern printing layer 6 (decoration printing pattern) formed by using the printing image data formed based on the reference value (design value) of the color information of the backer sheet 5 affects the color change of the backer sheet 5 and is different from the desired color, and there is a problem that the desired decoration image on the decorative sheet 1 cannot be obtained.

Here, in the invention, the color information of the backer sheet adhered to the printing sheet 3 is measured, and based on the difference between the measured value and the reference value (design value) of the color information of the backer sheet 5, the printing image data formed based on the reference value of the color information of the backer sheet 5 is corrected, and the image forming which forms the pattern printing layer 6 is performed. Hereinafter, an embodiment of the correction method of the printing data of the invention will be described.

Correction Method of Printing Image Data

Figure 3A:
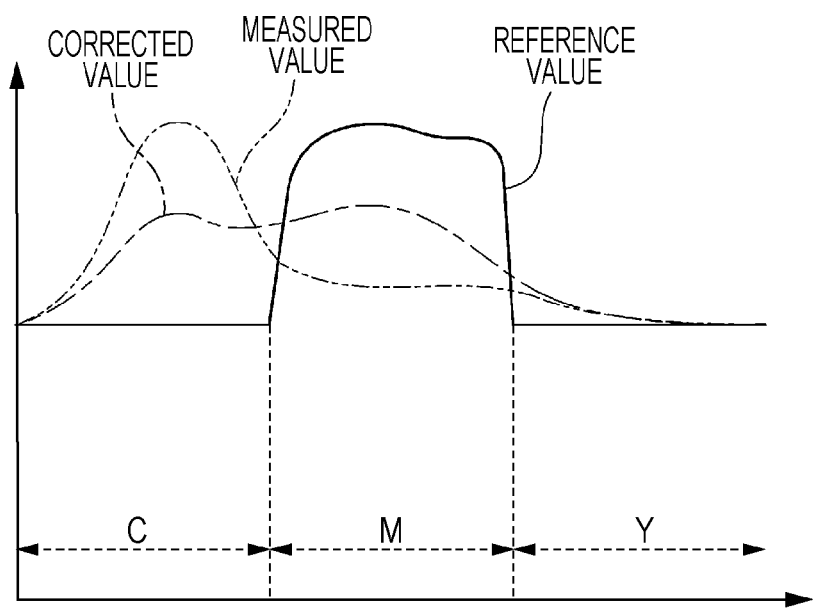
FIGS. 3A and 3B are schematic diagrams illustrating the correction method of the printing image data according to the embodiment.
Figure 3B:
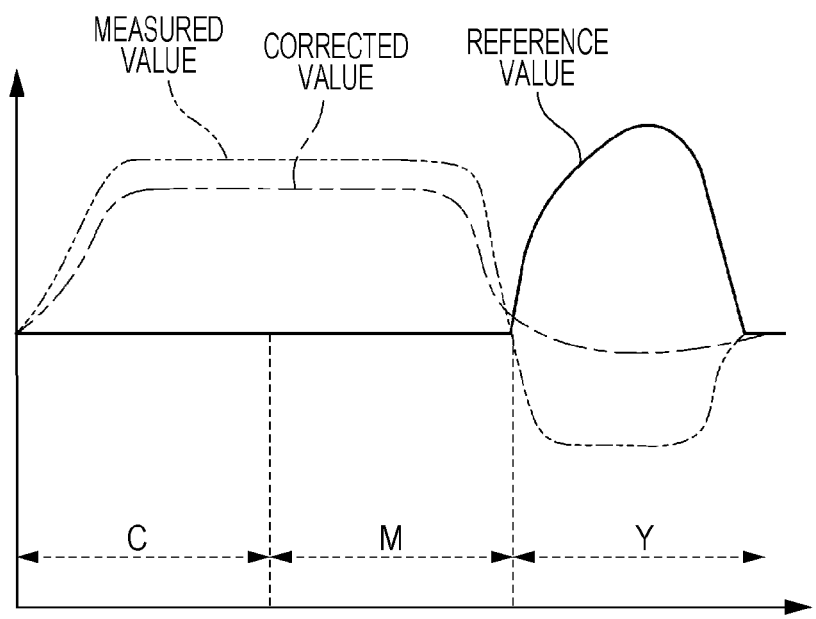

FIG. 2 is a flowchart illustrating the correction method of the printing image data according to an embodiment. In addition, FIGS. 3A and 3B are schematic diagrams illustrating a specific example of the correction method of the printing image data according to the embodiment.

In the correction method of the printing image data according to the embodiment, first, as illustrated in STEP S1 in FIG. 2, the color information of the backer sheet 5 to be laminated (or have been laminated) on the printing sheet 3 on which printing will be performed from hereon, is measured.

In measuring the color information of the backer sheet 5, it is preferable to measure the color information of the surface of the backer sheet 5 on which the printing sheet 3 is bonded. In the color information of the backer sheet 5, since the color information of the surface to which the printing sheet 3 is bonded affects the color of the decorative sheet 1 after printing, by measuring the color information of the surface and obtaining the measured value, it is possible to correct the printing image data efficiently and more effectively and to perform the desired decoration on the decorative sheet 1.

As a measuring method of the color information of a surface of the backer sheet 5 on which the printing sheet 3 is laminated, it is possible to apply, for example, a method that irradiates the backer sheet 5 with light and measures a reflection spectrum from a surface of the backer sheet 5 to which the printing sheet 3 is adhered by a spectrophotometer, a method that measures reflection color density which generally has 3 primary colors including cyan, magenta, and yellow, or including red, green, and blue, or the like.

In addition, it is preferable to perform the measurement of the color information of the backer sheet 5, for example, for every manufacturing lot of the backer sheet. In this manner, since it is possible to confirm whether the color difference caused by manufacturing unevenness is present or absent for every manufacturing lot of the backer sheet 5, it is possible to correct the color difference corresponding to requests, and to apply the decoration in which the desired color on the decorative sheet 1 is realized.

Next, in STEP S2, it is determined whether or not the measured value in the step of color information measurement of the backer sheet 5 is within an allowable range with respect to the reference value of the color information of the backer sheet 5.

In a case where the measured value of the color information of the backer sheet 5 is in the allowable range with respect to the reference value (YES in STEP S2), since the printing image data is not required to be corrected, the correction process of the printing image data is completed.

In a case where the measured value of the color information of the backer sheet 5 exceeds the allowable range with respect to the reference value (NO in STEP S2), in STEP S3, the printing image data is corrected based on the difference between the measured value of the color information and the reference value.

FIGS. 3A and 3B are schematic diagrams illustrating the correction method of the printing image data based on the difference between the measured value of the color information of the backer sheet 5 and the reference value. Here, FIGS. 3A and 3B illustrate the reference value, the measured value, and the corrected value formed based on the difference between the reference value and the measured value in the two decorative sheets 1 formed by using the backer sheet 5 having different colors. In other words, in the drawings, with respect to the reference value of the reflection spectrum of each color including cyan C, magenta M, and yellow Y, shown as a solid line, when the measured value of the reflection spectrum of each color, shown as a two dot chain line in the drawings, during the step of the color information measurement, based on the difference between the reference value and the measured value, corrected value shown as a one dot chain line in the drawings is derived and the correction data of the printing image data is generated from the corrected value.

Next, in STEP S4, in the correction method of the printing image data based on the measured value of the color information of the backer sheet 5 and the measured value with respect to the reference value, the correction data is registered to a storage unit of an image forming apparatus as a base material information known to be used during a following printing process, and the correction method of the printing image data is completed.

As described above, according to the correction method of the printing image data of the decorative sheet 1 of the embodiment, the color information of the backer sheet 5 which is used in the printing sheet 3 on which the printing is performed is measured, and the printing image data including the drawing data based on the reference value of the color information of the backer sheet 5, is corrected based on the difference between the measured value and the reference value. Accordingly, it is possible to correct the color difference between the reference value and the measured value of the color information of the backer sheet 5, and to apply the decoration in which realizes the desired color on the decorative sheet 1 is realized.

In addition, according to the embodiment, compared to a conventional intuitive evaluation method that performs a plurality of text printings in which the color of the printing sheet is changed, bonds the printing sheet on which the text printing is performed to the backer sheet, confirms the color of a plurality of decorative products on which the molding process is performed, and selects a color which is the nearest to the design value, it is possible to perform the correction of the printing image data more efficiently with a smaller number of processes.

An embodiment of the invention created by an inventor is described in detail above. However, the above-described embodiment of the invention is not limited thereto, and it is possible to apply various modifications without departing from the scope of the invention.

For example, in the above-described embodiment, a method that corrects the printing image data corresponding to the color difference which can occur between the manufacturing lots in the one-color backer sheet 5, is described.

Without being limited to this, in a case where another color in the same color system as a reference color is used with respect to the printing image data of the backer sheet having the color information as a reference, for example, in a case where a light gray backer sheet is used while the color information of the white backer sheet is used as a reference, it is possible to correct the printing image data and to apply the decoration of a desired color tone by the same method as the correction method of the printing image data of the above-described embodiment.

In addition, in the above-described embodiment, an example which uses the ink jet printing method as a method that forms the image on the printing surface 3a of the printing sheet 3 is described. However, the invention is not limited thereto. It is possible to use various well-known printing methods, such as a gravure printing method, an offset printing method, a screen printing method, a flexographic printing method, an electrostatic printing method, or the like.

In addition, in the above-described embodiment, the backer sheet 5 (adhering medium) is adhered to a surface opposite to the printing surface 3a of the printing sheet 3. However, the invention is not limited thereto. The same effect can be achieved by a configuration in which the printing surface 3a is adhered to the backer sheet which is the adhering medium.

In addition, in the above-described embodiment, the backer sheet 5 is formed in a sheet shape, but the invention is not limited thereto. The same effect can be achieved if a member is bonded to the printing sheet 3 by adhesion or the like, even if a thickness of the member is uneven according to a location.

The entire disclosure of Japanese Patent Application No. 2013-132384, filed Jun. 25, 2013 is expressly incorporated by reference herein.

What is claimed is:

1. A method for printing a decorative print sheet, the decorative print sheet including a printing medium and an adhering material that is bonded to a bottom surface of the printing medium, the method comprising:
   measuring color information for a top surface of the adhering material which is bonded to a bottom surface of the printing medium;
   determining a difference between the measured color information and a color information reference value associated with the adhering material;
   generating printing image data for the decorative print sheet; and
   printing on a top surface of the printing medium using the printing image data;
   wherein if the difference between the measured color information and the color information reference value is not within an allowable range, the printing image data is generated by a correction processing of the printing image data, wherein the correction processing adjusts the printing image data to account for an effect of the measured color of the top surface of the adhering material on a color of the decorative print sheet; and if the difference is within an allowable range, the printing image data is generated without the correction processing.

2. The method for printing a decorative print sheet according to claim 1, wherein the color information is measured for every manufacturing lot of the adhering material.

3. The method for printing a decorative print sheet according to claim 1, wherein the color information is reflected color information of the surface of the adhering material to which the printing medium is bonded.

4. A printing apparatus for printing a decorative print sheet, the decorative print sheet including a printing medium and an adhering material that is bonded to a bottom surface of the printing medium, the printing apparatus comprising:

a measurement section that measures color information for a top surface of the adhering material which is bonded to a bottom surface of the printing medium;

a determination section that determines a difference between the measured color information and a color information reference value associated with the adhering material;

a generation section that generates printing image data for the decorative print sheet; and a printing section that prints on a top surface of the printing medium using the printing image data;

wherein if the difference between the measured color information and the color information reference value is not within an allowable range, the printing image data is generated by a correction processing of the printing image data, wherein the correction processing adjusts the printing image data to account for an effect of the measured color of the top surface of the adhering material on a color of the decorative print sheet; and if the difference is within an allowable range, the printing image data is generated without the correction processing.

5. The printing apparatus for printing a decorative print sheet according to claim 4, wherein the color information is measured for every manufacturing lot of the adhering material.

6. The printing apparatus for printing a decorative print sheet according to claim 4, wherein the color information is reflected color information of a surface of the adhering material to which the printing medium is bonded.

* * * * *